(12) United States Patent
Baker et al.

(10) Patent No.: US 6,668,340 B1
(45) Date of Patent: Dec. 23, 2003

(54) METHOD SYSTEM AND PROGRAM FOR DETERMINING A TEST CASE SELECTION FOR A SOFTWARE APPLICATION

(75) Inventors: Ronald Bruce Baker, Wake Forrest, NC (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,753

(22) Filed: Dec. 10, 1999

(51) Int. Cl.[7] .................................................. G06F 11/00
(52) U.S. Cl. ............................ 714/38; 717/124; 714/26
(58) Field of Search ............................ 714/26, 25, 38, 714/37; 702/186; 703/22; 717/124

(56) References Cited

U.S. PATENT DOCUMENTS

| | | | | |
|---|---|---|---|---|
| 5,544,308 A | * | 8/1996 | Giordano et al. | 706/45 |
| 5,631,857 A | * | 5/1997 | Kobrosly et al. | 702/108 |
| 5,754,760 A | * | 5/1998 | Warfield | 395/183.14 |
| 5,892,947 A | * | 4/1999 | DeLong et al. | 395/701 |
| 5,913,023 A | * | 6/1999 | Szermer | 709/1 |
| 6,167,352 A | * | 12/2000 | Kanevsky et al. | 702/81 |
| 6,219,805 B1 | * | 4/2001 | Jones et al. | 714/25 |
| 6,385,741 B1 | * | 5/2002 | Nakamura | 714/33 |
| 6,415,396 B1 | * | 7/2002 | Singh et al. | 714/25 |

* cited by examiner

*Primary Examiner*—Robert Beausoliel
*Assistant Examiner*—Marc Duncan
(74) *Attorney, Agent, or Firm*—Leslie A. Van Leeuwen; Bracewell & Patterson, L.L.P.

(57) ABSTRACT

A method, system and program for determining a test case selection for a software application. Multiple risk values are assigned to each of the test cases of a software application, wherein the multiple risk values represent multiple types of risks associated with the software application not performing each function. An acceptable level of risk is designated. Only a subset of the test cases of the software are selected to test, wherein the subset comprises the test cases assigned risk values that exceed the acceptable level of risk, such that a risk-based test case selection for the software application is determined.

25 Claims, 6 Drawing Sheets

Fig. 1

| | Risk a | | | | Risk n | Accumulated Risk |
|---|---|---|---|---|---|---|
| Function a | 2 | 5 | . . . | 6 | 4 | 17 |
| . | | | | | | |
| . | | | | | | |
| . | | | | | | |
| | | | | | | |
| Function n | | | | | | |

FIG. 2

| | Business Risk | AIX 3.2.5 | AIX 4.1.4 | AIX 4.2 | Solaris 2.7 | Solaris 2.7 Jap | NT 4.0 | NT 4.0 J SP 3 | NT 4.0 Hebrew | USA | Japan | Korea | Israel | Germany | Italy | Norway | Cumulative Risk Value |
|---|---|---|---|---|---|---|---|---|---|---|---|---|---|---|---|---|---|
| Installation | | | | | | | | | | | | | | | | | |
| INST-001 | 3 | 3 | 3 | 3 | 0 | 0 | 3 | 3 | 2 | 3 | 3 | 3 | 0 | 3 | 3 | 2 | 35 |
| INST-002 | 3 | 3 | 3 | 3 | 0 | 0 | 3 | 3 | 2 | 3 | 3 | 3 | 0 | 3 | 3 | 2 | 35 |
| INST-003 | 3 | 3 | 3 | 3 | 0 | 0 | 3 | 3 | 2 | 3 | 3 | 3 | 0 | 3 | 3 | 2 | 35 |
| INST-004 | 3 | 3 | 3 | 3 | 0 | 0 | 3 | 3 | 2 | 3 | 3 | 3 | 0 | 3 | 3 | 2 | 35 |
| INST-005 | 3 | 3 | 3 | 3 | 0 | 0 | 3 | 3 | 2 | 3 | 3 | 3 | 0 | 3 | 3 | 2 | 35 |
| INST-006 | 3 | 3 | 3 | 3 | 0 | 0 | 3 | 3 | 2 | 3 | 3 | 3 | 0 | 3 | 3 | 2 | 35 |
| INST-007 | 3 | 3 | 3 | 3 | 0 | 0 | 3 | 3 | 2 | 3 | 3 | 3 | 0 | 3 | 3 | 2 | 35 |
| Client Deployment | | | | | | | | | | | | | | | | | |
| CDEP-001 | 2 | 1 | 2 | 2 | 0 | 0 | 3 | 3 | 0 | 3 | 2 | 2 | 0 | 2 | 2 | 2 | 25 |
| CDEP-002 | 3 | 1 | 2 | 2 | 0 | 0 | 3 | 3 | 0 | 3 | 2 | 2 | 0 | 2 | 2 | 2 | 26 |
| CDEP-003 | 2 | 1 | 2 | 2 | 0 | 0 | 3 | 3 | 0 | 3 | 2 | 2 | 0 | 2 | 2 | 2 | 25 |
| CDEP-004 | 1 | 1 | 2 | 2 | 0 | 0 | 3 | 3 | 0 | 3 | 2 | 2 | 0 | 2 | 2 | 2 | 24 |
| CDEP-005 | 0 | 1 | 2 | 2 | 0 | 0 | 3 | 3 | 0 | 3 | 2 | 2 | 0 | 2 | 2 | 2 | 23 |
| Firewall | | | | | | | | | | | | | | | | | |
| FIRE-001 | 2 | 0 | 2 | 2 | 0 | 0 | 2 | 2 | 0 | 2 | 2 | 2 | 0 | 2 | 2 | 2 | 20 |
| FIRE-002 | 2 | 0 | 2 | 2 | 0 | 0 | 2 | 2 | 0 | 2 | 2 | 2 | 0 | 2 | 2 | 2 | 20 |
| FIRE-003 | 2 | 0 | 2 | 2 | 0 | 0 | 2 | 2 | 0 | 2 | 2 | 2 | 0 | 2 | 2 | 2 | 20 |
| FIRE-004 | 1 | 0 | 1 | 1 | 0 | 0 | 1 | 1 | 0 | 1 | 1 | 1 | 0 | 1 | 1 | 1 | 30 |
| FIRE-005 | 0 | 0 | 0 | 0 | 0 | 0 | 0 | 0 | 0 | 0 | 0 | 0 | 0 | 1 | 1 | 1 | 2 |

METHOD SYSTEM AND PROGRAM FOR DETERMINING A TEST CASE SELECTION FOR A SOFTWARE APPLICATION

BACKGROUND OF THE INVENTION

1. Technical Field

The present invention relates to an improved method for testing a software application and in particular to a method, system and program for determining a test case selection for a software application. Still more particularly, the present invention relates to a method, system and program for determining which test cases should be tested for a software application based on risk factors determined for each function of a software application.

2. Description of the Related Art

As computers have become more prevalent, it has become desirable for software developers to be able to market their products to users of a variety of operating systems, operating under a variety of versions of the operating systems, in a variety of languages. Thereby, software applications continue to grow in complexity as support for multiple operating systems and multiple versions of operating systems, in addition to support for multiple language versions, is added.

As the complexity of a software application is increased, the complexity of testing the software application is also increased. Ideally, the software application should be tested for every function under every supported operating system and with every supported language. However, typically, the time allotted for a testing cycle prior to a software application release does not provide for such testing. For example, a software application with 100 functions to test for with five operating systems and seven languages would take an unacceptable amount of time to test. In addition, if such time were allotted for testing, a software application would typically be outdated before testing would be completed and the product released.

In previous testing methods, each portion of code for a software application was weighted equally, resulting in the need to test each portion of the code. However, for typical software applications, it can be assumed that the typical user will only utilize about 40% of the code controlling the software application. In addition, there are typical functions which need to perform in order for a user to be satisfied with a software application and/or to meet contractual obligations for the performance of a software application. For example, installation of the spelling check function for a word processor application is typically highly important, however installation of the about box is of lower importance.

Therefore, in view of the growing complexity of software applications leading to a growing complexity in test cases, it would be preferable to provide a method of determining which functions of a software applications are the most important to test and thereby determining a method for testing each software application. In addition, it would preferable to determine a risk associated with the software application not performing each of the function, and testing all functions which have an associated risk which is greater than an acceptable risk factor, such that a selection of functions of a software applications that are the most important to test may be determined and tested in a timely manner.

SUMMARY OF THE INVENTION

In view of the foregoing, it is therefore an object of the present invention to provide a software application.

It is another object of the present invention to provide a method, system and program for determining a test case selection for a software application.

It is yet another object of the present invention to provide a method, system and program for determining which test cases should be tested for a software application based on risk values determined for each risk factor and each function of a software application.

In accordance with the method, system and program of the present invention, multiple risk values are assigned to each of the test cases of a software application, wherein the multiple risk values represent multiple types of risks associated with the software application not performing each function. An acceptable level of risk is designated. Only a subset of the test cases of the software are selected to test, wherein the subset comprises the test cases assigned risk values that exceed the acceptable level of risk, such that a risk-based test case selection for the software application is determined.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF THE PREFERRED EMBODIMENT

The present invention may be executed in a variety of systems, including a variety of computers under a number of different operating systems. The computer may be, for example, a personal computer, a network computer, a midrange computer or a mainframe computer. In addition, the computer may be a stand-alone system or part of a network such as a local-area network (LAN) or a wide-area network (WAN). For the purposes of illustration, a preferred embodiment of the present invention, as described below, is implemented on a personal computer, such as the Aptiva series manufactured by International Business Machines Corporation.

Figure 1:
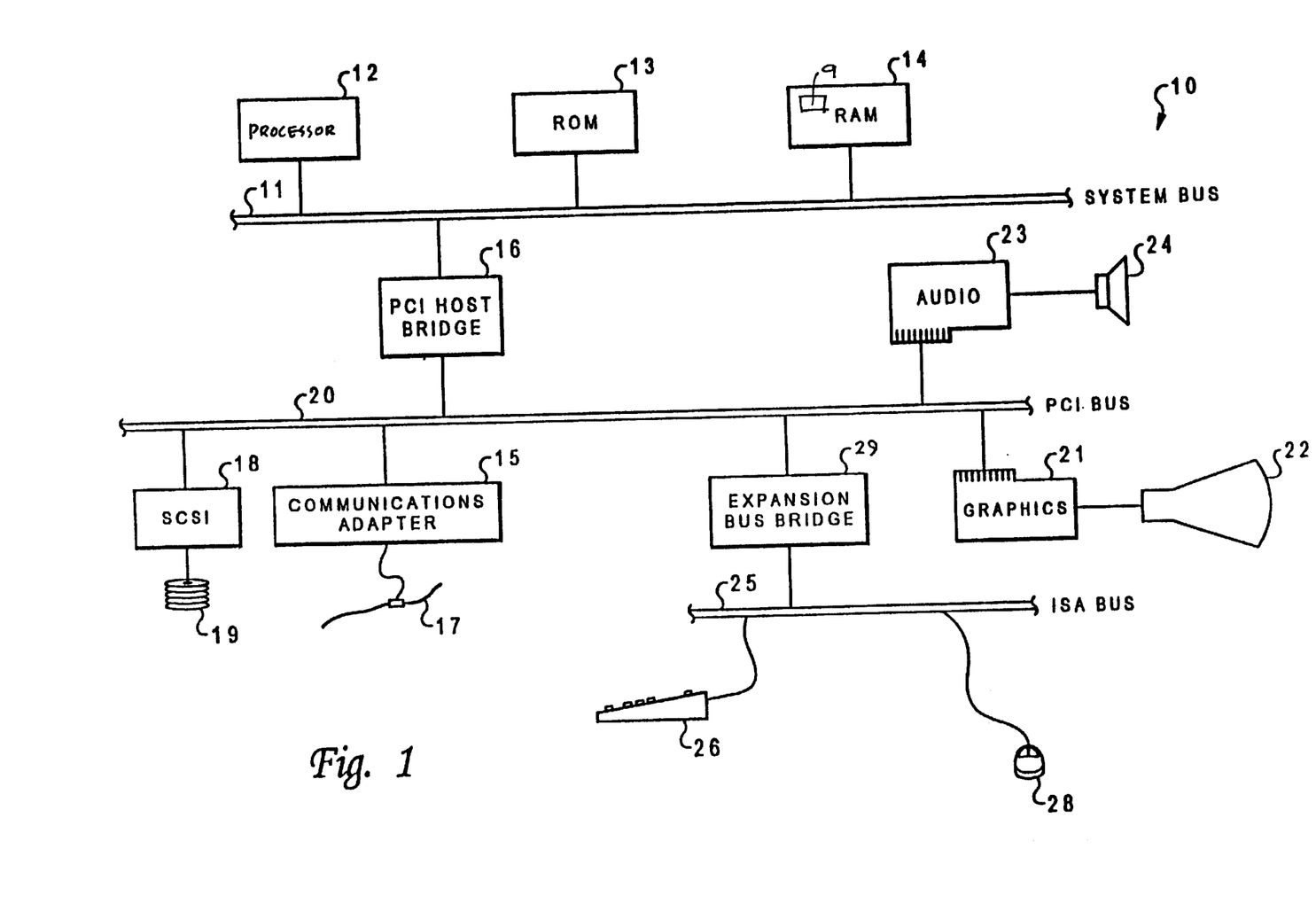
FIG. 1 depicts a block diagram of a typical computer system that may utilize a preferred embodiment of the present invention.

Referring now to the drawings and in particular to FIG. 1, there is depicted a block diagram of a typical computer system that may utilize a preferred embodiment of the present invention. As shown, a processor (CPU) 12, a read-only memory (ROM) 13, and a Random-Access Memory (RAM) 14 are connected to a system bus 11 of a computer system 10. CPU 12, ROM 13, and RAM 14 are also coupled to a PCI local bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

Also attaching to PCI local bus 20 are communications adapter 15, small computer system interface (SCSI) 18, and expansion bus bridge 29. Communications adapter 15 is for connecting computer system 10 to a network 17. SCSI 18 is utilized to control high-speed SCSI disk drive 19. Expansion bus bridge 29, such as a PCI-to-ISA bus bridge, may be utilized for coupling ISA bus 25 to PCI local bus 20. As shown, a keyboard 26 and a mouse 28 are attached to ISA bus 25 for performing certain basic I/O functions. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added.

Computer system 10 also preferably includes an interface such as a graphical user interface (GUI) and an operating system (OS) that reside within machine readable media to direct the operation of computer system 10. Any suitable machine-readable media may retain the GUI and OS, such as RAM 14, ROM 13, SCSI disk drive 19, and other disk and/or tape drive(e.g. magnetic diskette, magnetic tape, CD-ROM, optical disk, or other suitable storage media). Any suitable GUI and OS may direct CPU 12. For example, the AIX operating system is one of IBM's operating systems which may be implemented.

Further, computer system 10 preferably includes at least one software application(e.g. program product) that resides within machine readable media, for example as a test program 9 residing within RAM 14. A software application contains instructions that when executed on CPU 12 carry out the operations depicted in the flow chart of FIG. 5 and others described herein.

Figure 2:
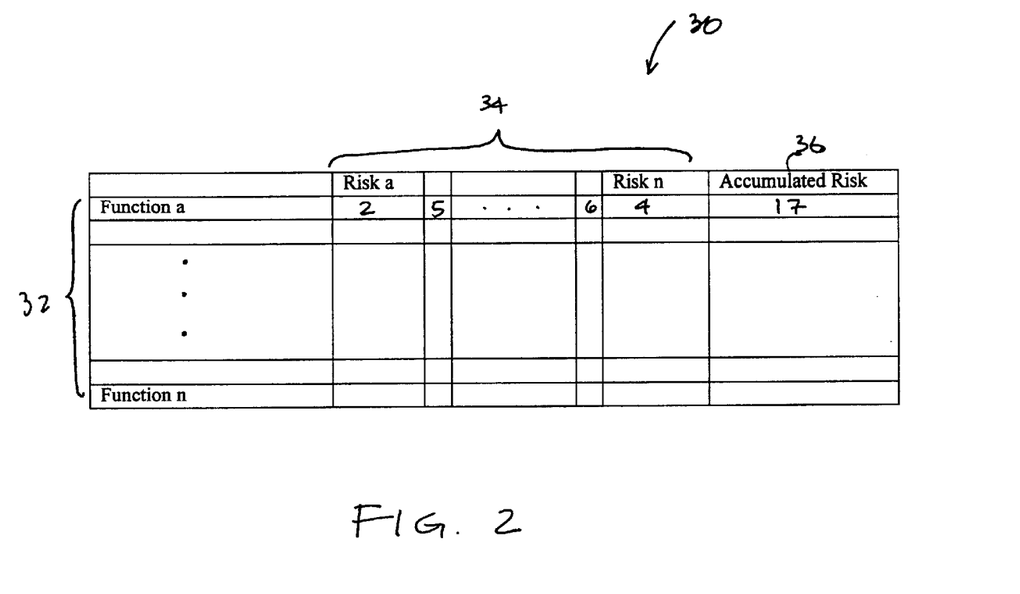
FIG. 2 illustrates a chart utilized for entering risk values for multiple test cases with multiple types of risk.

With reference now to FIG. 2, there is depicted a chart utilized for entering risk values for multiple test cases with multiple types of risk. Chart 30 illustrates multiple functions 32a–32n along a first axis of chart 30 and multiple types of risk 34a–32n along a second axis. In addition, column 36, for accumulating the total risk of sets of multiple types of risk 34a–32n, is depicted. For function 32a, risk values have been entered for each of multiple types of risk 34a–32n.

Each of the risk values entered represents a risk value of a test case. Preferably, a selection of test cases to perform is determined based on the risk values assigned thereto.

In addition, an accumulated risk value is calculated for the intersection of column 36 and function 32a. In the present example, the accumulated risk is additive, however in other embodiments of the present invention, the accumulated risk may be determined utilizing a weighted formula or other accumulation factor.

In particular, in determining functions 32a–32n, it is desirable to model the normal life cycle of a software product as closely as possible. In general, the normal life cycle of a software product includes installation, configuration, normal operation, backup and archiving, patching, and deleting or upgrading. Therefore, functions 32a–32n preferably encompass all the functions utilized in the normal life cycle of a software product.

In determining the types of risk 34a–32n, a first major type of risk is the business risk associated with a function not performing, regardless of the operating or language. For example, there is a greater business risk associated with a software product not installing properly than with an about box not functioning.

In addition, there is a risk associated with a function not performing correctly or returning corrupt results for multiple operating systems. For example, there is a greater risk associated with a function not performing with an operating system that 60% of the target market utilizes than with an operating system that only 5% of the target market utilizes. Therefore, analysis of the market share of different operating systems may be utilized to determine the risk associated with each operating system.

Further, there is a risk associated with a function not translating into other written languages. For example, Western European languages typically add accented characters in translation. However, Asian languages utilize multibyte encodings and may also utilize composed characters. In determining the risk, for example, there is a greater risk associated with a function of a software application not performing in a written language utilized by 50% of the target market than with a written language utilized by 2% of the target market. Therefore, analysis of the countries and languages in which the software application will be utilized may determine the risk associated with each written language.

Figure 3:
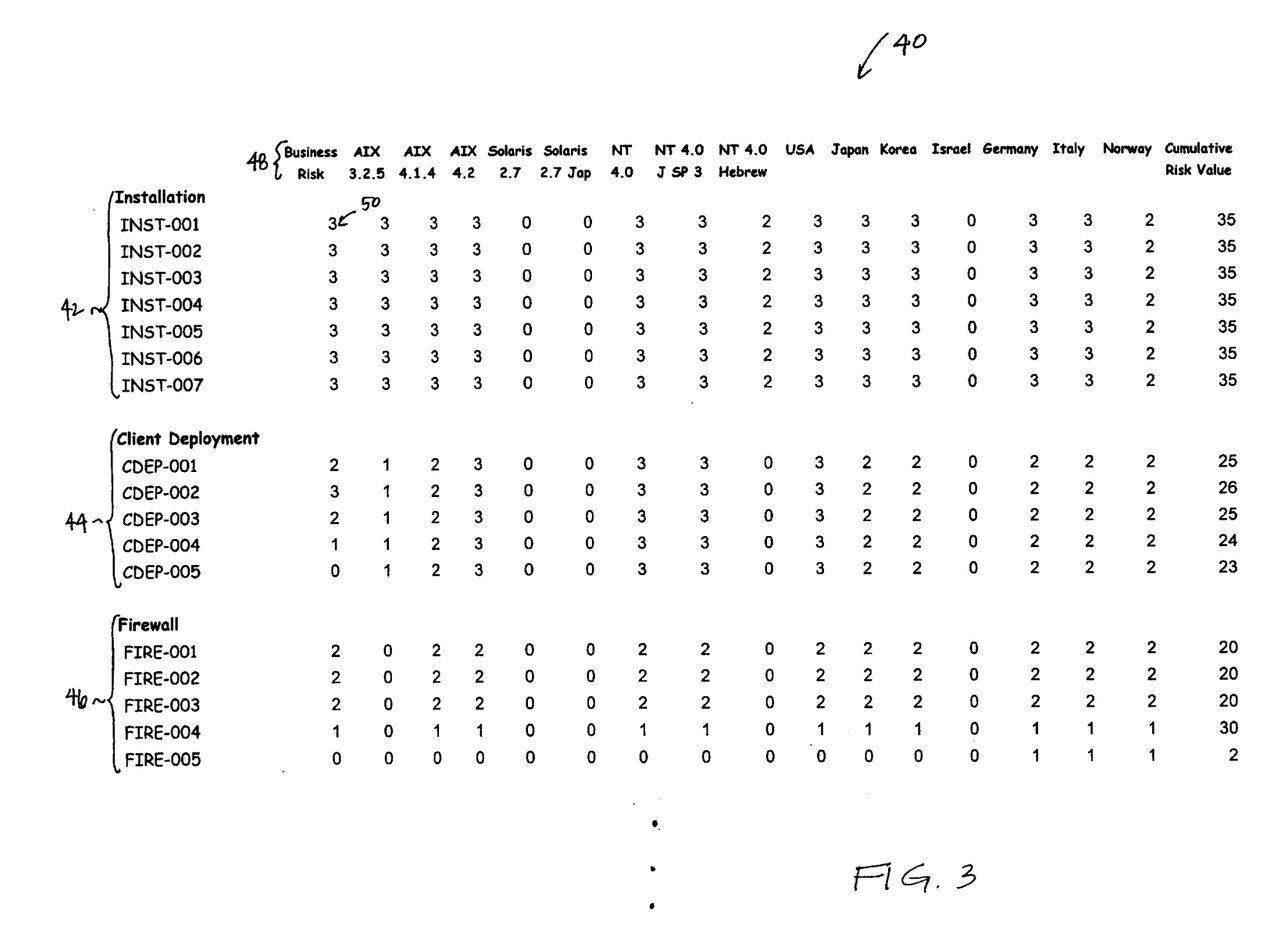
FIG. 3 depicts a graphical display of a chart of risk values for a particular software application.

Referring now to FIG. 3, there is illustrated a graphical display of a chart of risk values for a particular software application in accordance with the invention. Chart 40 includes multiple installation functions 42, multiple client deployment functions 44, and multiple firewall functions 46. In addition, chart 40 includes multiple risk factors 48, including business risk, multiple operating systems and versions thereof, and multiple languages. Among the operating systems listed, AIX is a trademark of IBM Corporation and Windows NT is a trademark of Microsoft Corporation.

Multiple risk values, such as a risk value 50, are illustrated wherein each of functions 42, 44 and 46 are assigned risk values for each of risk factors 48. For the present example, a numerical value between 0 and 3 is assigned where a numerical value of 0 represents minimal performance risk and a numerical value of 3 represents substantial performance risk.

Each of the multiple risk values, such as risk value 50, represents a test case. In order to determine which test cases will be tested, an acceptable risk value level must be determined. Any test cases with risk values greater than the acceptable risk value level should be tested. For example, if a risk value level of "2" is determined, then each of the test cases with risk levels greater than "2" should be tested. Alternatively, an acceptable cumulative risk level for the cumulative risk value may be utilized.

Figure 4A:
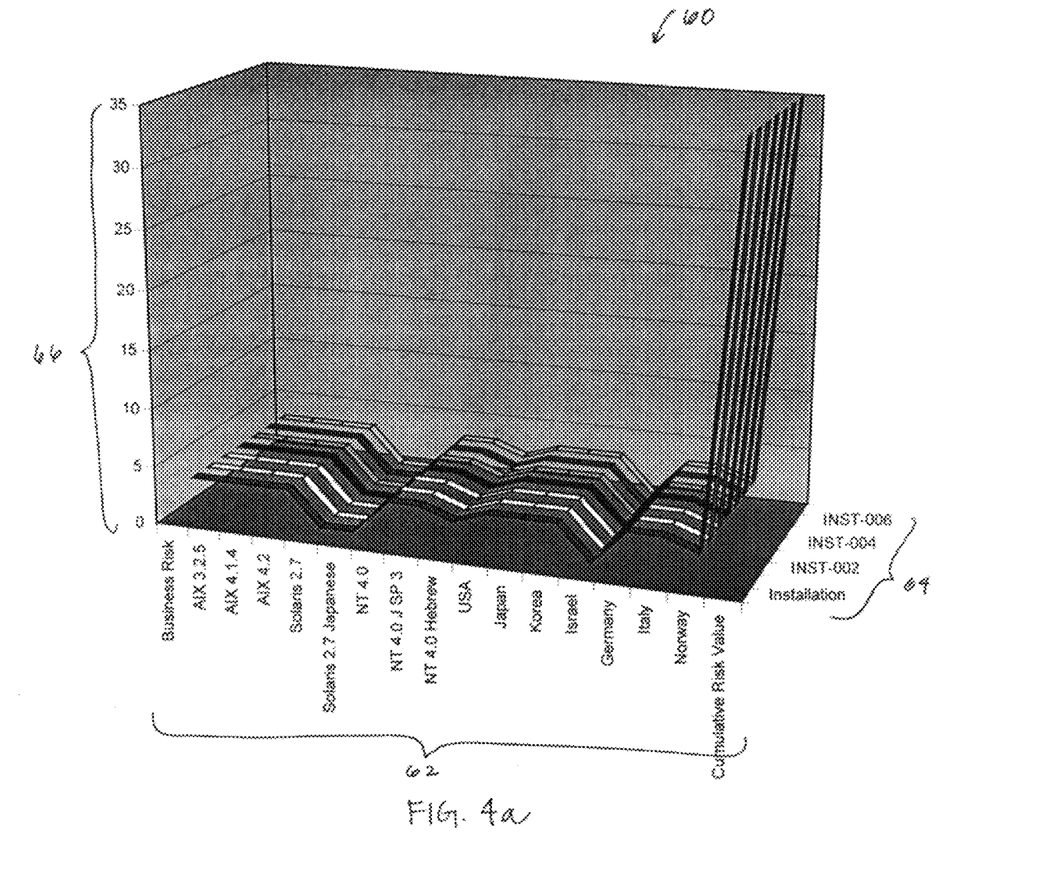
FIGS. 4a–4b illustrates a graphical display of a graph for illustrating cumulative risk values for the test cases illustrated in FIG. 3.

With reference now to FIGS. 4a–4b, there is depicted a graphical display of a graph for illustrating cumulative risk values for the test cases illustrated in FIG. 3. Referring to FIG. 4a, chart 60 illustrates a three-dimensional plot of the test cases depicted in FIG. for installation functions 42. A first axis 62 depicts each of risk factors 48 of FIG. 3. A second axis 64 illustrates each of functions 42 of FIG. 3. A third axis 66 depicts a numerical value corresponding to the risk value for each test case.

Figure 4B:
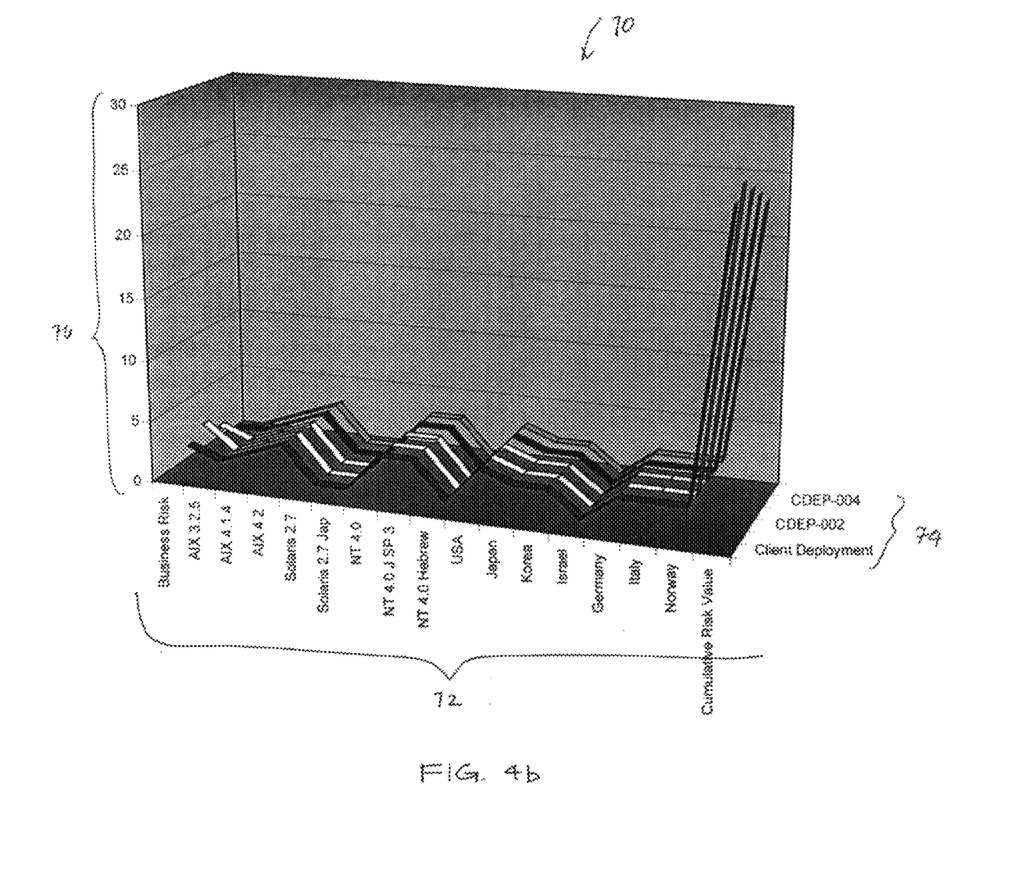

Referring to FIG. 4b, chart 70 depicts a three-dimensional plot of the test cases depicted in FIG. 3 for client deployment functions 44. A first axis 72 illustrates each of risk factors 48 of FIG. 3. A second axis 74 depicts each of functions 44 of FIG. 3. A third axis 76 illustrates a numerical value corresponding to the risk value for each test case. While not depicted, a three-dimensional plot of the test cases in FIG. 3 for firewall functions 46 may also be determined. Further, all of the functions depicted in FIG. 3 may be included in a single graphical plot.

Utilizing charts 60 and 70, all test cases which have a risk value greater than an acceptable risk level can be determined. For example, in chart 60, for an acceptable risk level of the numerical value 2, there are multiple risk values displayed above the numerical value of 2. By selecting test cases with a risk value greater than an acceptable risk level the number of test cases that must be tested is reduced.

In general, from the graphical plot, several islands of risk may be determined where all the test cases in an area are assigned the same risk value. For example, the test cases for all of the installation functions for operating systems AIX 3.2.5, AIX 4.1.4, and AIX 4.2 form an island of risk. In addition, islands of risk are distinguished by barrier reef formations in the plot where the risk values are less than the risk value assigned for the island of risk. For example, a barrier reef is formed by all the test cases involving installation functions for the Solaris 2.7 Japanese operating system. From analyzing the various islands of risk formed from the barrier reefs, an acceptable risk level may be determined. Further, acceptable risk levels may be determined for each set of functions. In addition, alternative methods may be utilized in determining an acceptable risk level.

Figure 5:
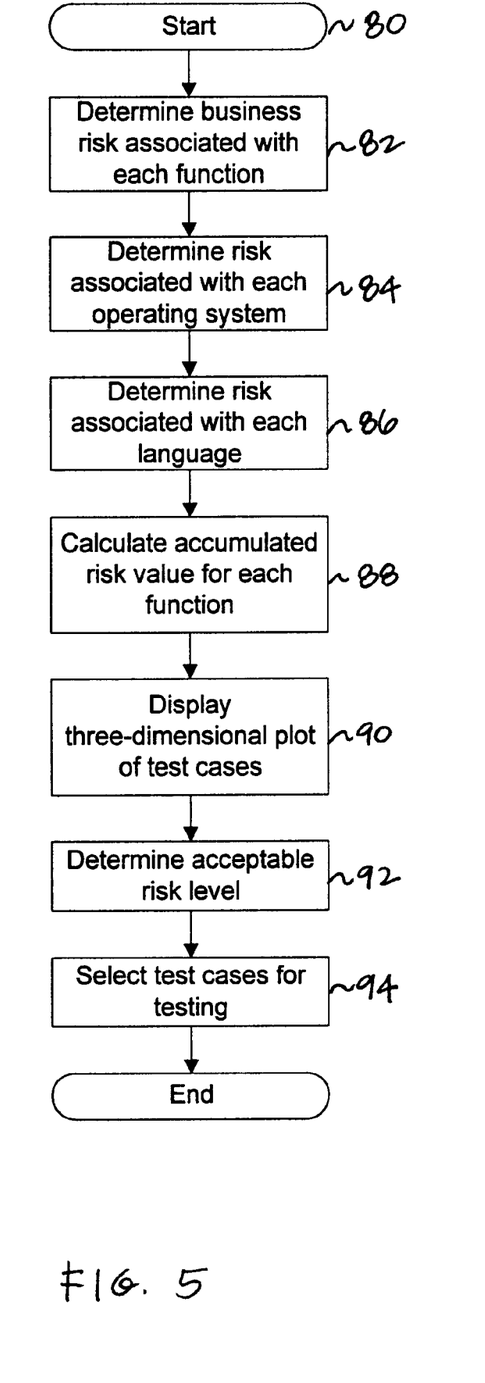
FIG. 5 depicts a high level logic flowchart of a process for determining a test case selection for a software application.

Referring now to FIG. 5, there is illustrated a high level logic flowchart of a process for determining a test case selection for a software application. As depicted, the process starts at block 80 and thereafter proceeds to block 82. Block 82 illustrates determining a business risk value associated with each function. The business risk may be determined from user input, or for example, from statistical analysis designating a monetary value associated with each function. Thereafter, block 84 depicts determining a risk value associated with each operating system for each function. The risk value associated with each operating system may be determined from user input, or for example, from statistical analysis designating the percentages of the target market that utilize each operating system.

Next, block 86 illustrates determining a risk value associated with each language for each function. The risk value associated with each language may be determined from user input, or for example, from statistical analysis designating the percentages of the target market utilizing each language that are potential customers. Thereafter, block 88 depicts calculating the accumulated risk value for each function. The accumulated risk value may be determined by adding the risk values assigned to each function. Alternatively, a formula may be utilized to calculate an accumulated risk value.

Block 90 illustrates displaying a three-dimensional plot of the test cases. Thereafter, block 92 depicts determining an acceptable level of risk. The acceptable level of risk may be determined from user input, or for example, from analysis of the islands of risk and barrier reefs in the plot. Next, block 94 illustrates designating a selection of test cases for testing. Thereafter, the process ends.

As has been described, the present invention provides a method and system for determining a test case selection for a software application. Although the determination of a test case selection can be made through entering risk values into a chart and displaying the results of a chart in a graphical format, other methods of entering risk values may be utilized and other methods of displaying the accumulated risk values may be provided. For example, a three-dimensional graph is utilized to display the results of accumulated risk values, however other types of graphical models may also be utilized. In addition other methods of displaying all risk values which exceed an acceptable risk value level may be displayed by alternate methods. Further, the implementation of the present invention may be carried out utilizing conventional software applications which provide for entering data in a chart format which can then be graphically plotted.

It important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD ROMs and transmission-type media such as analogue or digital communications links.

While the invention has been particularly shown and described with reference to a preferred embodiment, it will be understood by those skilled in the art that various changes in form and detail may be made herein without departing from the spirit and scope of the invention.

What is claimed is:

1. A method for determining a test case selection for a software application, said method comprising the steps of:

assigning a plurality of risk values to each of a plurality of test cases of a software application, wherein said plurality of risk values represent a plurality of types of risks associated with said software application not performing each of a plurality of functions;

designating an acceptable level of risk;

selecting only a subset of said plurality of test cases of said software to test, wherein said subset comprises said plurality of test cases assigned risk values that exceed said acceptable level of risk, such that a risk-based test case selection for said software application is determined.

2. The method for determining a test case selection for a software application according to claim 1, wherein said step of assigning a plurality of risk values to each of a plurality of test cases of a software application, further comprises the step of:

assigning a plurality of numerical values to each of said plurality of test cases of a software application, wherein each said numerical value represents a risk associated with each of said plurality of functions not performing.

3. The method for determining a test case selection for a software application according to claim 1, wherein said step of assigning a plurality of risk values to each of a plurality of test cases of a software application, further comprises the step of:

assigning at least one operating system as a type of risk of said plurality of types of risk.

4. The method for determining a test case selection for a software application according to claim 1, wherein said step of assigning a plurality of risk values to each of a plurality of test cases of a software application, further comprises the step of:

assigning a business risk as a type of risk of said plurality of types of risk.

5. The method for determining a test case selection for a software application according to claim 1, said step of assigning a plurality of risk values to each of a plurality of test cases of a software application, further comprises the step of:

assigning at least one operating system as a type of risk of said plurality of types of risk, wherein a risk value assigned to said at least one operating system represents a relative amount of users of said at least one operating system.

6. The method for determining a test case selection for a software application according to claim 1, said step of assigning a plurality of risk values to each of a plurality of test cases of a software application, further comprises the step of:

assigning at least one language as a type of risk of said plurality of types of risk, wherein a risk value assigned to said at least one language represents a relative amount of users of said at least one language.

7. The method for determining a test case selection for a software application according to claim 1, said method further comprising the step of:

accumulating said assigned plurality of risk values for each of said plurality of functions in order to determine a total risk associated with said software application not performing each of said plurality of functions.

8. The method for determining a test case selection for a software application according to claim 7, wherein said step of accumulating said assigned plurality of risk values for each of said plurality of functions in order to determine a total risk associated with said software application not performing each of said plurality of functions, further comprises the step of:

accumulating a risk value for a particular function from a business risk value, at least one operating system risk value, and at least one language risk value in order to determine a total risk associated with said software not performing said particular function for an operating system associated with said operating system risk value.

9. The method for determining a test case selection for a software application according to claim 1, wherein said step of selecting only a subset of said plurality of functions of said software to test, further comprises the step of:

graphically displaying a representation of said plurality of test cases.

10. A system for determining a test case selection for a software application, said system comprising:

means for assigning a plurality of risk values to each of a plurality of test cases of a software application, wherein said plurality of risk values represent a plurality of types of risks associated with said software application not performing each of a plurality of functions;

means for designating an acceptable level of risk;

means for selecting only a subset of said plurality of test cases of said software to test, wherein said subset comprises said plurality of test cases assigned risk values that exceed said acceptable level of risk, such that a risk-based test case selection for said software application is determined.

11. The system for determining a test case selection for a software application according to claim 10, said means for assigning a plurality of risk values to each of a plurality of test cases of a software application, further comprising:

means for assigning a plurality of numerical values to each of said plurality of test cases of a software application, wherein each said numerical value represents a risk associated with each of said plurality of functions not performing.

12. The system for determining a test case selection for a software application according to claim 10, said means for assigning a plurality of risk values to each of a plurality of test cases of a software application, further comprising:

means for assigning at least one operating system as a type of risk of said plurality of types of risk.

13. The system for determining a test case selection for a software application according to claim 10, said means for assigning a plurality of risk values to each of a plurality of test cases of a software application, further comprising:

means for assigning a business risk as a type of risk of said plurality of types of risk.

14. The system for determining a test case selection for a software application according to claim 10, said means for assigning a plurality of risk values to each of a plurality of test cases of a software application, further comprising:

means for assigning at least one operating system as a type of risk of said plurality of types of risk, wherein a risk value assigned to said at least one operating system represents a relative amount of users of said at least one operating system.

15. The system for determining a test case selection for a software application according to claim 10, said means for assigning a plurality of risk values to each of a plurality of test cases of a software application, further comprising:

means for assigning at least one language as a type of risk of said plurality of types of risk, wherein a risk value assigned to said at least one language represents a relative amount of users of said at least one language.

16. The system for determining a test case selection for a software application according to claim 10, said system further comprising:

means for accumulating said assigned plurality of risk values for each of said plurality of functions in order to determine a total risk associated with said software application not performing each of said plurality of functions.

17. The system for determining a test case selection for a software application according to claim 16, said means for accumulating said assigned plurality of risk values for each of said plurality of functions in order to determine a total risk associated with said software application not performing each of said plurality of functions, further comprising:

means for accumulating a risk value for a particular function from a business risk value, at least one operating system risk value, and at least one language risk value in order to determine a total risk associated with said software not performing said particular function for an operating system associated with said operating system risk value.

18. The system for determining a test case selection for a software application according to claim 10, said means for selecting only a subset of said plurality of test cases of said software to test, further comprising:

means for graphically displaying a representation of said plurality of test cases.

19. A computer program product, residing on a computer usable medium and having computer usable program means embodied therein, said computer program means comprising:

means for assigning a plurality of risk values to each of a plurality of test cases of a software application, wherein said plurality of risk values represent a plurality of types of risks associated with said software application not performing each of a plurality of functions;

means for designating an acceptable level of risk;

means for generating a selected subset of said plurality of test cases of said software to test, wherein said subset comprises said plurality of test cases assigned risk values that exceed said acceptable level of risk, such that a risk-based test case selection for said software application is determined.

20. The computer program product according to claim 19, said computer program means further comprising:

means for assigning a plurality of numerical values to each of said plurality of test cases of a software application, wherein each said numerical value represents a risk associated with each of said plurality of functions not performing.

21. The computer program product according to claim 19, said computer program means further comprising:

means for assigning at least one operating system as a type of risk of said plurality of types of risk.

22. The computer program product according to claim 19, said computer program means further comprising:

means for assigning at least one operating system as a type of risk of said plurality of types of risk, wherein a risk value assigned to said at least one operating system represents a relative amount of users of said at least one operating system.

23. The computer program product according to claim 19, said computer program means further comprising:

means for assigning at least one language as a type of risk of said plurality of types of risk, wherein a risk value assigned to said at least one language represents a relative amount of users of said at least one language.

24. The computer program product according to claim 19, said computer program means further comprising:

means for enabling the processing of the accumulation of a risk value for a particular function from a business risk value, an operating system risk value, and a language risk value, in order to determine a total risk associated with said software not performing said particular function for an operating system associated with said operating system risk value.

25. The computer program product according to claim 19, said computer program means further comprising:

means for generating a graphical display of a representation of said plurality of test cases.

\* \* \* \* \*